(12) United States Patent
Schirmer et al.

(10) Patent No.: US 11,173,642 B1
(45) Date of Patent: Nov. 16, 2021

(54) BLOWN FILM COEXTRUSION LINE WITH POLYGONAL EXTRUDER ARRANGEMENT

(71) Applicant: BBS Corporation, Spartanburg, SC (US)

(72) Inventors: Henry G. Schirmer, Spartanburg, SC (US); Roger Blaine Trivette, Boiling Springs, SC (US); Matthew G. Hampshire, Chesnee, SC (US)

(73) Assignee: BBS Corporation, Spartanburg, SC (US)

( * ) Notice: Subject to any disclaimer, the term of this patent is extended or adjusted under 35 U.S.C. 154(b) by 0 days.

(21) Appl. No.: 17/226,921

(22) Filed: Apr. 9, 2021

(51) Int. Cl.
| | |
|---|---|
| *B29C 48/265* | (2019.01) |
| *B29C 48/49* | (2019.01) |
| *B29C 48/10* | (2019.01) |
| *B29C 48/18* | (2019.01) |
| *B29C 48/00* | (2019.01) |
| *B29C 55/28* | (2006.01) |
| *B29C 48/21* | (2019.01) |
| *B29C 48/25* | (2019.01) |

(52) U.S. Cl.
CPC ........ *B29C 48/265* (2019.02); *B29C 48/0018* (2019.02); *B29C 48/10* (2019.02); *B29C 48/18* (2019.02); *B29C 48/21* (2019.02); *B29C 48/266* (2019.02); *B29C 48/49* (2019.02); *B29C 55/28* (2013.01)

(58) Field of Classification Search
CPC ..... B29C 48/0018; B29C 48/10; B29C 48/18; B29C 48/185; B29C 48/21; B29C 48/265; B29C 48/266; B29C 48/28; B29C 48/49
See application file for complete search history.

(56) References Cited

U.S. PATENT DOCUMENTS

| | | |
|---|---|---|
| 2,820,249 A | 1/1958 | Colombo |
| 3,308,508 A | 3/1967 | Schrenk |
| 3,321,803 A | 5/1967 | Corbett |
| 3,565,985 A | 2/1971 | Schrenk et al. |
| 3,756,758 A | 9/1973 | Prall |

(Continued)

FOREIGN PATENT DOCUMENTS

| | | |
|---|---|---|
| DE | 19927556 | 12/2000 |
| EP | 0471879 | 2/1992 |

(Continued)

OTHER PUBLICATIONS

Schirmer et al., "Nano-Layer Structural Advances in Shrink Films," SPE Polyolefins Conference, Houston, Texas, Feb. 2013, 13 pages.

(Continued)

*Primary Examiner* — Xiao S Zhao
*Assistant Examiner* — Joseph S Leyson
(74) *Attorney, Agent, or Firm* — Maxwell J. Petersen; FisherBroyles, LLP

(57) ABSTRACT

A blown film coextrusion line includes a support frame, a plurality of extruders each mounted to the support frame and extending upward at an angle, and a downward facing blown film coextrusion die connected to distal ends of each of the plurality of extruders and receiving individual polymer streams from them. The blown film coextrusion line is compact and sturdy and eliminates much of the floor space and towered mounting structure that was required for conventional blown film coextrusion lines.

20 Claims, 5 Drawing Sheets

(56) References Cited

U.S. PATENT DOCUMENTS

| | | |
|---|---|---|
| 3,759,647 A | 9/1973 | Schrenk et al. |
| 3,924,990 A | 12/1975 | Schrenk |
| 3,980,744 A | 9/1976 | Cogswell |
| 4,125,585 A | 11/1978 | Rosenbaum |
| 4,167,383 A | 9/1979 | Murakami et al. |
| 4,208,175 A | 6/1980 | Rosenbaum |
| 4,249,875 A | 2/1981 | Hart et al. |
| 4,669,965 A | 6/1987 | Murakami |
| 4,715,803 A | 12/1987 | Koppa |
| 4,772,195 A | 9/1988 | Touchet |
| 4,798,526 A | 1/1989 | Briggs et al. |
| 4,832,589 A | 5/1989 | Gini et al. |
| 4,889,477 A | 12/1989 | Wortberg et al. |
| 5,035,596 A | 7/1991 | Pohl |
| 5,076,776 A | 12/1991 | Yamada et al. |
| 5,103,337 A | 4/1992 | Schrenk et al. |
| 5,110,530 A | 5/1992 | Havens |
| 5,292,472 A | 3/1994 | Tompkins |
| 5,516,472 A | 5/1996 | Laver |
| 5,518,036 A | 5/1996 | DeMasters et al. |
| 5,538,411 A | 7/1996 | Gates |
| 5,690,972 A | 11/1997 | Planeta et al. |
| 5,723,157 A | 3/1998 | Grutjen |
| 5,762,971 A | 6/1998 | Schirmer |
| 5,891,480 A * | 4/1999 | Schmidt .............. B29C 55/28 425/66 |
| 6,000,926 A | 12/1999 | Schirmer |
| 6,082,025 A | 7/2000 | Bonk |
| 6,383,589 B1 | 5/2002 | Akutagawa |
| 6,413,595 B1 | 7/2002 | Schirmer |
| 8,241,736 B2 | 8/2012 | Ramli et al. |
| 8,870,561 B2 | 10/2014 | Schirmer |
| 9,381,723 B2 | 7/2016 | Kumar et al. |
| 10,611,129 B2 | 4/2020 | Schirmer |
| 2001/0000234 A1 | 4/2001 | Helms, Jr. et al. |
| 2001/0015513 A1 | 8/2001 | Schaftingen |
| 2005/0271761 A1* | 12/2005 | Ohki .................. B29B 7/7495 425/133.5 |
| 2007/0243276 A1* | 10/2007 | Carneiro ............. B29C 48/902 425/113 |
| 2008/0274349 A1 | 11/2008 | Giammatteo |
| 2009/0087654 A1 | 4/2009 | Ling |
| 2010/0072655 A1 | 3/2010 | Roberts et al. |
| 2010/0215879 A1 | 8/2010 | Dooley |
| 2010/0227136 A1 | 9/2010 | Ramli |
| 2011/0227922 A1 | 9/2011 | Rivett |
| 2011/0264057 A1 | 10/2011 | Eversull |
| 2013/0009336 A1 | 1/2013 | Ausen et al. |
| 2013/0243894 A1 | 9/2013 | Schirmer |
| 2014/0363600 A1 | 12/2014 | Dooley |
| 2018/0029338 A1 | 2/2018 | Schirmer |
| 2020/0391425 A1 | 12/2020 | Schirmer |
| 2020/0391427 A1 | 12/2020 | Schirmer |

FOREIGN PATENT DOCUMENTS

| | | |
|---|---|---|
| EP | 0626247 | 11/1994 |
| FR | 2625941 | 7/1989 |
| GB | 2161745 | 1/1986 |
| WO | 0076765 | 12/2000 |
| WO | 2011119323 | 9/2011 |
| WO | 2016086314 | 6/2016 |
| WO | 2017083633 | 5/2017 |

OTHER PUBLICATIONS

Schrenk et al., "Coextruding Multilayer Blown Film—Part 1," SPE Journal, vol. 29 pp. 38-42, Jun. 1973.

Schrenk et al., "Coextruding Multilayer Blown Film—Part 2," SPE Journal, vol. 29 pp. 43-47, Jul. 1973.

* cited by examiner

BLOWN FILM COEXTRUSION LINE WITH POLYGONAL EXTRUDER ARRANGEMENT

FIELD OF THE INVENTION

This present invention is directed to a blown film coextrusion line having an advantageous extruder and die arrangement that provides a sturdy structure and enables a cost saving, compact fit into smaller spaces for transport and use.

BACKGROUND OF THE INVENTION

Conventional blown film coextrusion lines typically utilize from two to four extruders (sometimes more) that are horizontally disposed and feed into an upward or downward facing blown film coextrusion die and bubble. The conventional lines require substantial space and a support structure, sometimes called a "tower," that contains and stabilizes the coextrusion die, blown film bubble and collapsing nip rollers. For an upward facing blown film line, the extruders are commonly located at or slightly above operator standing level and the blown film bubble travels to collapsing nip rollers that are significantly higher than operator standing level. For a downward facing blown film line, the collapsing nip rollers are closer to operator standing level, however the extruders are significantly higher than operator standing level. The support structure must then be large enough and sturdy enough to maintain and stabilize the extruders at an elevated height.

Improvements in blown film coextrusion technology have resulted in more compact coextrusion die structures that significantly shortened the height required for the blown film coextrusion die while substantially increasing the number of layers (while reducing the thickness of individual layers) in the coextruded blown film structure. Modular disk coextrusion dies are known for providing multilayer blown films having high numbers of layers. U.S. Pat. Nos. 5,762,971 and 6,000,926, both issued to Schirmer, disclose an original modular disk coextrusion die that includes a plurality of cells of thin annular disks stacked on top of each other. Each cell includes, in sequence, an end cap disk, a distribution disk, an internal cap disk and a spreader disk (referred to as a spacer disk in the patents). In FIG. 4 of each patent, seven cells are stacked on top of each other and another end cap disk is added to enable production of a seven-layer blown film using melt streams that are individually processed into film layers in each of the cells. The disks and cells are bolted together to make a single seven-layer die. Each of the cells produces one layer of the multilayer film.

U.S. Publication 2020/0391425 and U.S. Publication 2020/0391427, both to Schirmer, disclose an improved modular disk coextrusion die having an opposing disk arrangement that enables the production of nanolayer films having up to 300 or more layers, using symmetrically arranged cells of thin annular disks that produce two film layers per cell, with each cell being fed at opposing inlet locations that are 180 degrees apart from each other. The drawings of each publication illustrate 24-layer nanolayer structures formed using twelve of the cells stacked on top of each other and four extruders, each feeding a different polymer composition. Each cell has two opposed entry points and the twelve-cell die uses twelve polymer entry points to produce 24 nanolayers.

While modular disk coextrusion dies require significantly less vertical height than conventional blown film coextrusion dies, the extruders have required significant floor space or elevated space and a relatively complex support structure such as a tower is still needed for the overall blown film line. There is a need or desire for a blown film coextrusion line, especially a nanolayer blown film coextrusion line, that can produce complex film structures having large numbers of layers while requiring less space and a more efficient support structure.

SUMMARY OF THE INVENTION

The present invention is directed to a blown film coextrusion line that includes a support frame, a plurality of extruders each mounted to the support frame and extending upward at an angle, and a downward facing blown film coextrusion die connected to distal ends of each of the plurality of extruders and receiving individual polymer streams from them. The angular arrangement of extruders may resemble a triangle, trapezoid, pyramid or other polygonal or polyhedral shape because the plurality of extruders generally tilt inward, toward each other and toward the blown film coextrusion die. The resulting blown film coextrusion line is compact, sturdy, and eliminates much of the floor space and towered mounting structure that was required for conventional blown film coextrusion lines.

In one embodiment, the support frame can include at least four upright support elements, a plurality of lateral support elements each joined to at least two of the upright support elements, and at least one longitudinal support element extending between at least two of the lateral support elements. At least a first extruder can be supported by a first of the lateral support elements and can extend upward from the first lateral support element at a first angle. At least a second extruder can be supported by a second of the lateral support elements and can extend upward from the second lateral support element at a second angle. The first and second angles oppose each other, meaning that the first and second extruders are tilted toward each other so that the distal end of each extruder is in fluid communication with an inlet to the downward facing blown film coextrusion die. The first and second angles can be about 20 to about 70 degrees relative to horizontal, or about 30 to about 60 degrees relative to horizontal, or about 35 to about 55 degrees relative to horizontal, or about 40 to about 50 degrees relative to horizontal, or about 45 degrees relative to horizontal.

In some embodiments, third, fourth, fifth, sixth, seventh, eighth, ninth, tenth, eleventh and/or twelfth extruders can be mounted to the support frame at the same, similar or different angles pointing upward and inward so that the distal end of each and every extruder is in fluid communication with and suitably connected to a corresponding inlet in the downward facing blown film coextrusion die. In one embodiment, elements of the mounting frame can include a movable platform to which the extruders are mounted, and a mechanism for raising and lowering the movable platform. When the movable platform is raised or lowered, all of the extruders and the downward facing blown film coextrusion die are raised or lowered in tandem so as to lengthen or shorten the downward traveling blown film bubble that is being extruded from the die. In one embodiment, the blown film coextrusion line includes bubble collapsing nip rollers and, suitably, a winding assembly at or near the base of the mounting frame.

With the foregoing in mind, one embodiment of the blown film coextrusion line can include:

a support frame including at least four upright support elements, a plurality of lateral support elements each joined to at least two of the upright support elements, and at least one longitudinal support element extending between at least two of the lateral support elements;

at least a first extruder supported by a first of the lateral support elements and extending upward from the first of the lateral support elements at a first angle;

at least a second extruder supported by a second of the lateral support elements and extending upward from the second of the lateral support elements at a second angle; and a downward facing blown film coextrusion die in fluid communication with a first distal end of the first extruder and a second distal end of the second extruder;

wherein the first angle is from about 20 to about 70 degrees relative to horizontal, the second angle is about 20 to about 70 degrees relative to horizontal, and the first and second angles oppose each other.

Another embodiment of the blown film coextrusion line can include:

a support frame including at least four upright support elements, a plurality of lateral support elements each joined to at least two of the upright support elements, and at least one longitudinal support element extending between at least two of the lateral support elements;

at least four extruders mounted to the plurality of lateral support elements, wherein at least a first and a third of the four extruders extend upward from a first of the lateral support elements at first and third angles, respectively, and at least a second and fourth of the four extruders extend upward from a second of the lateral support elements at second and fourth angles, respectively; and a downward facing blown film coextrusion die in fluid communication with a first distal end of the first extruder, a second distal end of the second extruder, a third distal end of the third extruder and a fourth distal end of the fourth extruder;

wherein each of the first and third angles is from about 30 to about 60 degrees relative to horizontal, each of the second and fourth angles is about 30 to about 60 degrees relative to horizontal, and the second and fourth angles oppose the first and third angles.

Still another embodiment of the blown film coextrusion line can include:

a support frame;

at least a first extruder mounted to the support frame and extending upward from the support frame at a first angle;

at least a second extruder mounted to the support frame and extending upward from the support frame at a second angle; and a downward facing blown film coextrusion die in fluid communication with a first distal end of the first extruder and a second distal end of the second extruder;

wherein the first angle is from about 30 to about 60 degrees relative to horizontal, the second angle is about 30 to about 60 degrees relative to horizontal, and the first and second angles oppose each other.

The foregoing and other features and advantages will become further apparent from the following detailed description, read in conjunction with the accompanying drawings.

DETAILED DESCRIPTION OF THE INVENTION

Figure 1:
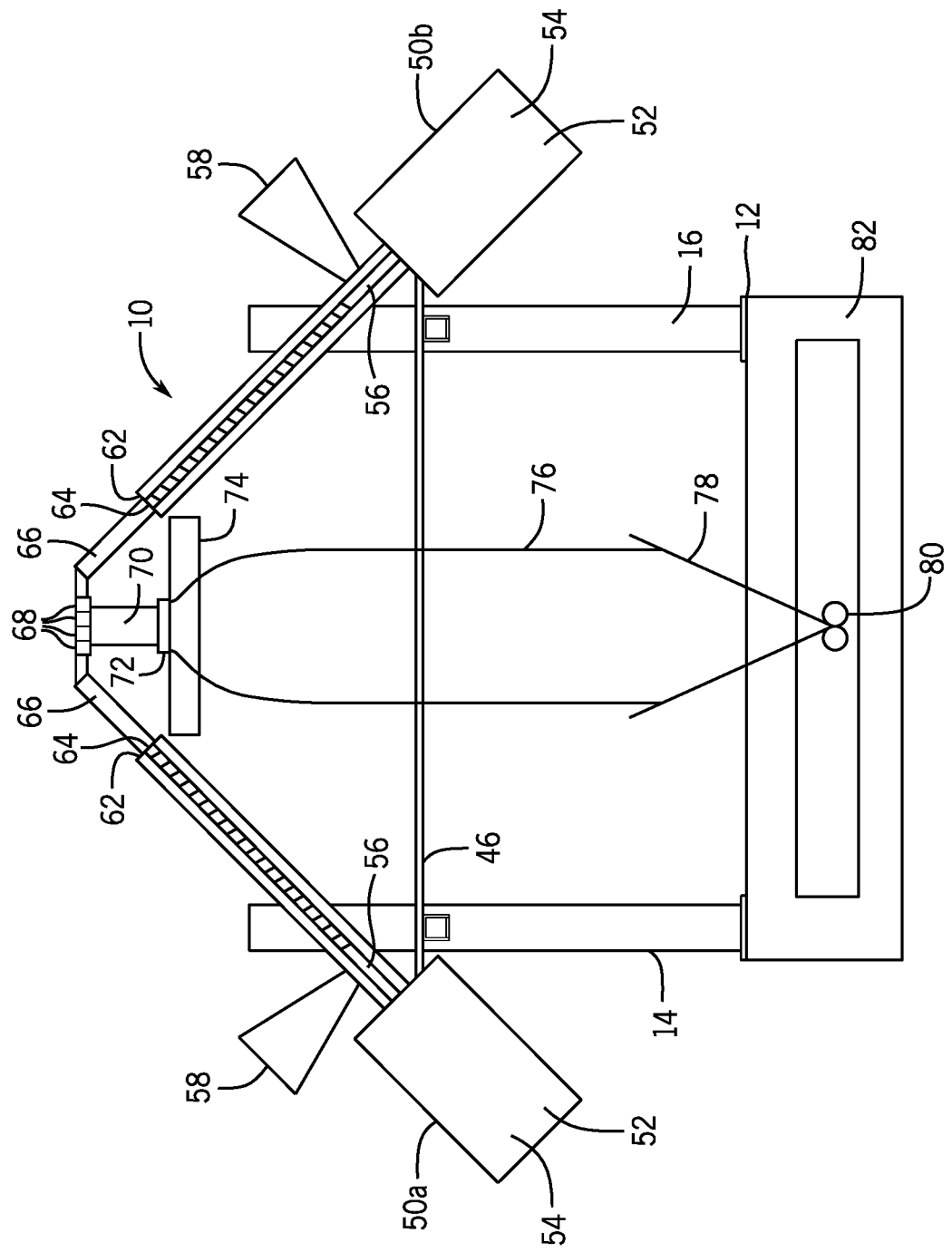
FIG. 1 schematically illustrates a front view one embodiment of the blown film coextrusion line.
Figure 2:
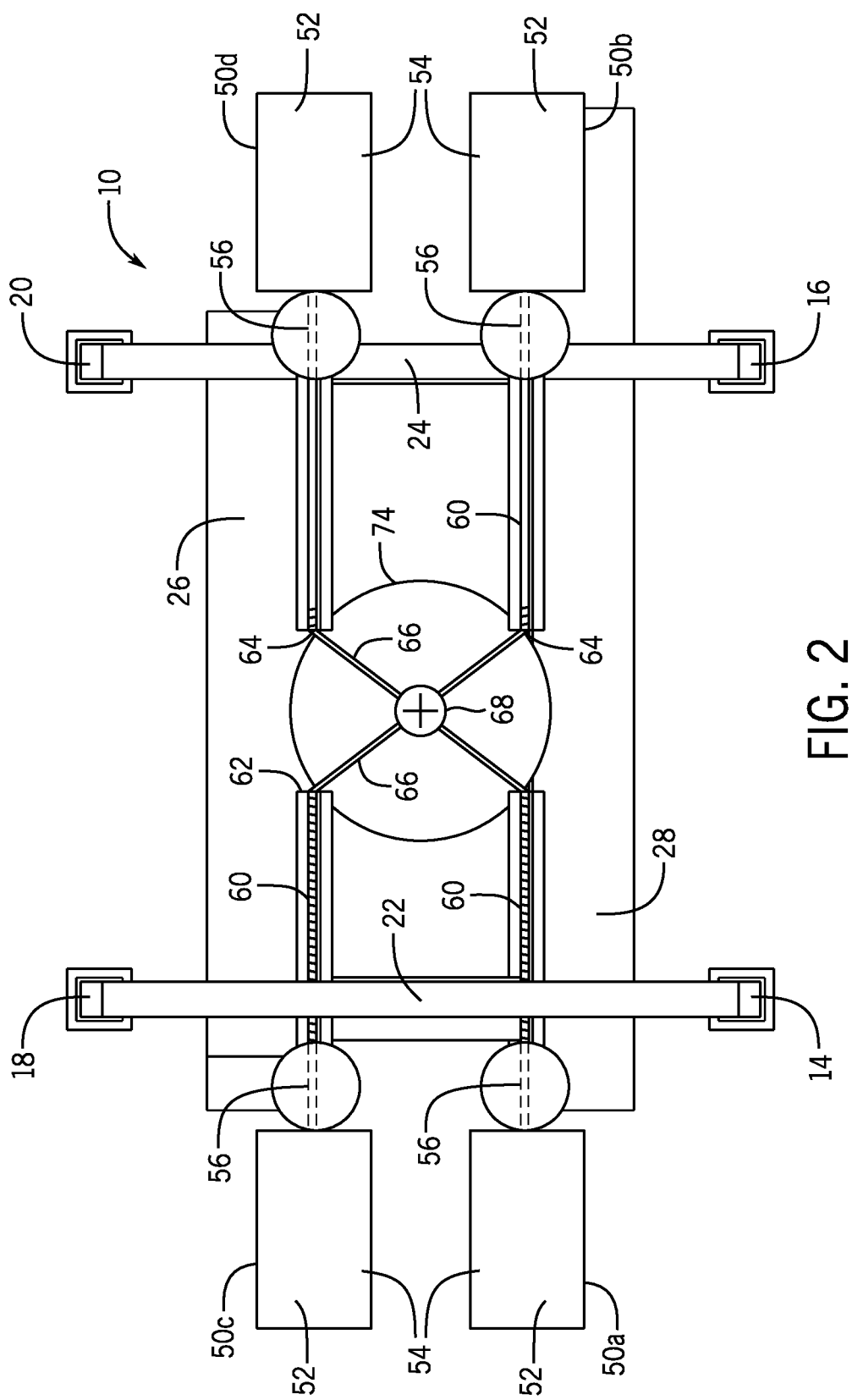
FIG. 2 schematically illustrates a top view of the blown film coextrusion line of FIG. 1.
Figure 3:
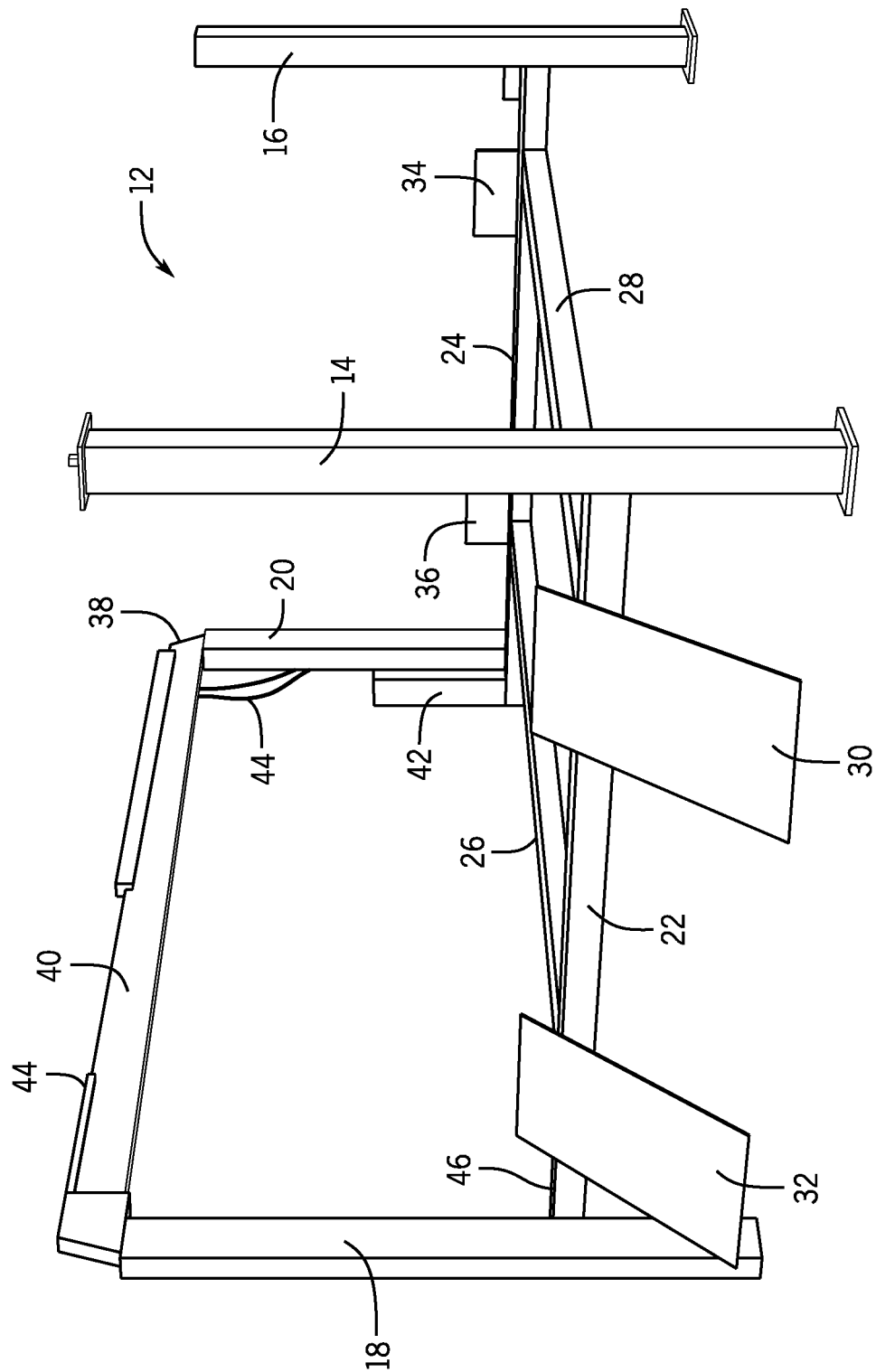
FIG. 3 is a perspective view of one embodiment of a mounting frame useful in the blown film coextrusion line.

Referring to FIGS. 1-3, an exemplary blown film coextrusion die 10 includes a support frame 12 (whose details are shown in FIG. 3) that includes at least four upright support elements 14, 16, 18 and 20, a plurality of lateral support elements 22 and 24, and one or more longitudinal support elements 26 and 28. Each of the lateral support elements is joined to at least two of the upright support elements. As shown, a first lateral support element 22 is joined to upright support elements 14 and 18. A second lateral support element 24 is joined to upright support elements 16 and 20. Each of the longitudinal support elements extends between and is joined to at least two of the lateral support elements. As shown, longitudinal support elements 26 and 28 extend between and are joined to the first and second lateral support elements 22 and 24. The support frame 12 can also include a plurality of mounting pads 30, 32, 34 and 36 which can be connected to the first and second lateral support elements 22 and 24, and can be pivotally connected to the lateral support elements to enable posturing at different angles.

The support frame 12 can also include one or more elevation mechanisms 38, each of which can include an overhead mounting bar 40 extending between and connected to two of the upright support elements, e.g., 18 and 20, motor driven pulley 42 connected to at least one of the lateral and/or longitudinal support elements, e.g., lateral support element 24, and one or more cables 44 connected to two or more of the lateral and/or longitudinal support elements. In the support frame 12 shown in FIG. 3, the lateral and longitudinal support elements 22, 24, 26 and 28 define a movable platform 46 that can be moved vertically relative to the upright support elements 14, 16, 18 and 20. Because these elements are interconnected, the motor driven pulley 42 manipulates the cables 44 to vertically elevate or lower the entire platform 46, as well as the extruders and blown film die that are supported by the platform 46 as described below. The structural elements of the support frame 12 are suitably constructed of heavy duty steel, for example, heavy duty stainless steel, so that the support frame 12 is capable of withstanding loads of five to ten tons or more depending on the size and capacity of the blown film coextrusion line 10. One example of a suitable support frame is a Tuxedo® 12,000-lb. Four Post Lift-Cable Driven, sold by SEGA Equipment, LLC.

In the embodiment of FIGS. 1-2, four extruders 50a, 50b, 50c and 50d (collectively "50") are securely mounted to the support frame 12, suitably via mounting pads 30, 32, 34 and 36, which in turn are connected to the first and second lateral support elements 22 and 24 of the support frame 12. Each of the extruders can include a drive motor 52 at its proximal end 54, which can be a torque drive motor. Advantages of using torque drive motors include lighter weight because no gear box is required, and sufficient power to push the polymer feed uphill at an angle through the extruders. Each of the extruders can also include a feed section 56 into which polymer is fed through a hopper 58, an extrusion section 60, and a distal end 62 defining an exit 64. Each distal end 62 can be connected to a feed line 66 that is in turn connected to and feeds a respective individual inlet 68 of a downward facing blown film coextrusion die 70. In one embodiment, the blown film coextrusion die 70 can have as many as twelve separate inlets 68 arranged around the circumference of a thin annular feeding disk as described in the above-identified U.S. Publication 2020/0391425 and U.S. Publication 2020/0391427, incorporated herein by reference, and each of the polymer inlets 68 can ultimately produce several nanolayer film layers having the respective polymer composition.

The four extruders 50*a*, 50*b*, 50*c* and 50*d* can be positioned at angles relative to horizontal. In the illustrated embodiment, the first extruder 50*a* is positioned at a first angle and the second extruder 50*b* is positioned at a second angle, with the first end second angles opposing each other. The third extruder 50*c* is positioned at a third angle which can also opposes the second angle. The fourth extruder 50*d* is positioned at a fourth angle that opposes the third angle and can also oppose the first angle. The phrases "opposing angles" and "angles that oppose each other" mean that the subject extruders are tilted toward each other, for example in a triangular or trapezoidal configuration. The first, second, third and fourth angles can each be about 20 to about 70 degrees from horizontal, or about 30 to about 60 degrees from horizontal, or about 35 to about 55 degrees from horizontal, or about 40 to about 50 degrees from horizontal, or about 45 degrees from horizontal as shown. The opposing first and third angles can be of the same magnitude, but in some cases may have different magnitudes. The opposing second and fourth angles may be of the same magnitude, but in some cases may have different magnitudes. In alternative embodiments further described below, the blown film coextrusion line 10 can include fifth, sixth, seventh, eighth, ninth, tenth, eleventh and/or twelfth extruders that can be mounted on opposite sides of the support frame 12 in similar opposing fashion as the extruders 50*a*, 50*b*, 50*c* and 50*d* at angles within the ranges described above, with the extruders on the opposite sides being mounted at angles that oppose each other. This enables the distal end 62 of each extruder to feed polymer into the blown film coextrusion die 70 while the proximal end 54 of each extruder can be positioned on or below the opposing first and second lateral support elements 22 and 24 of the support frame 12.

In addition to an annular disk arrangement such as described in the foregoing U.S. Publication 2020/0391425 and U.S. Publication 2020/0391427, the blown film coextrusion die 70 includes an end plate 72 resting above an air ring 74 which is sized so that it can be connected to and supported by engaging portions of the extruders 50*a*, 50*b*, 50*c* and 50*d*. The blown film coextrusion die 70 is also supported by the hanging connections provided by the feed lines 66 extending from the four extruders. By surrounding and sandwiching the blown film coextrusion die 70 between the extruders 50*a*, 50*b*, 50*c* and 50*d*, the feed lines 66 and the appropriately sized air ring 74, the blown film coextrusion die 70 can be maintained in a stable position during operation without requiring the use of a tower as used in conventional blown film coextrusion lines. The blown film coextrusion die 70 thus produces a stable bubble 76 that can be ultimately collapsed upon entering collapsing frame 78, passed between nip rollers 80 located at or near the base 82 of support frame 12, and wound and stored as a flat film.

The downward facing blown film coextrusion die 70 can have a variety of die configurations provided they are sufficiently compact to fit within the limited available space. Suitable die configurations include without limitation known modular disk coextrusion die configurations, including without limitation modular disk coextrusion dies with opposing disk arrangements described in U.S. Publication 2020/0391425 and U.S. Publication 2020/0391427, both issued to Schirmer, the disclosures of which are incorporated herein by reference. These and other modular disk coextrusion die employ suitable arrangements of thin annular disks to produce a variety of complex and more simple blown film structures, including nanolayer blown film structures having unique barrier properties and other physical characteristics. The foregoing modular disk coextrusion dies can comfortably accommodate up to twelve polymer entry points that can be used to form repeating and/or alternating layer arrangements having up to twelve different polymer compositions. By extruding the bubble 76 downward, it is possible to add a liquid through the die 70 that forms a reservoir above the nip rolls 80. Creating a hydrostatic pressure that can reduce or eliminate edge wrinkles. The space below the air cooling ring 70 is sufficiently large to add secondary air cooling rings (not shown) to enable coextrusion at higher rates. The blown film coextrusion line includes a winder assembly at or near a base of the support frame.

Figure 4:
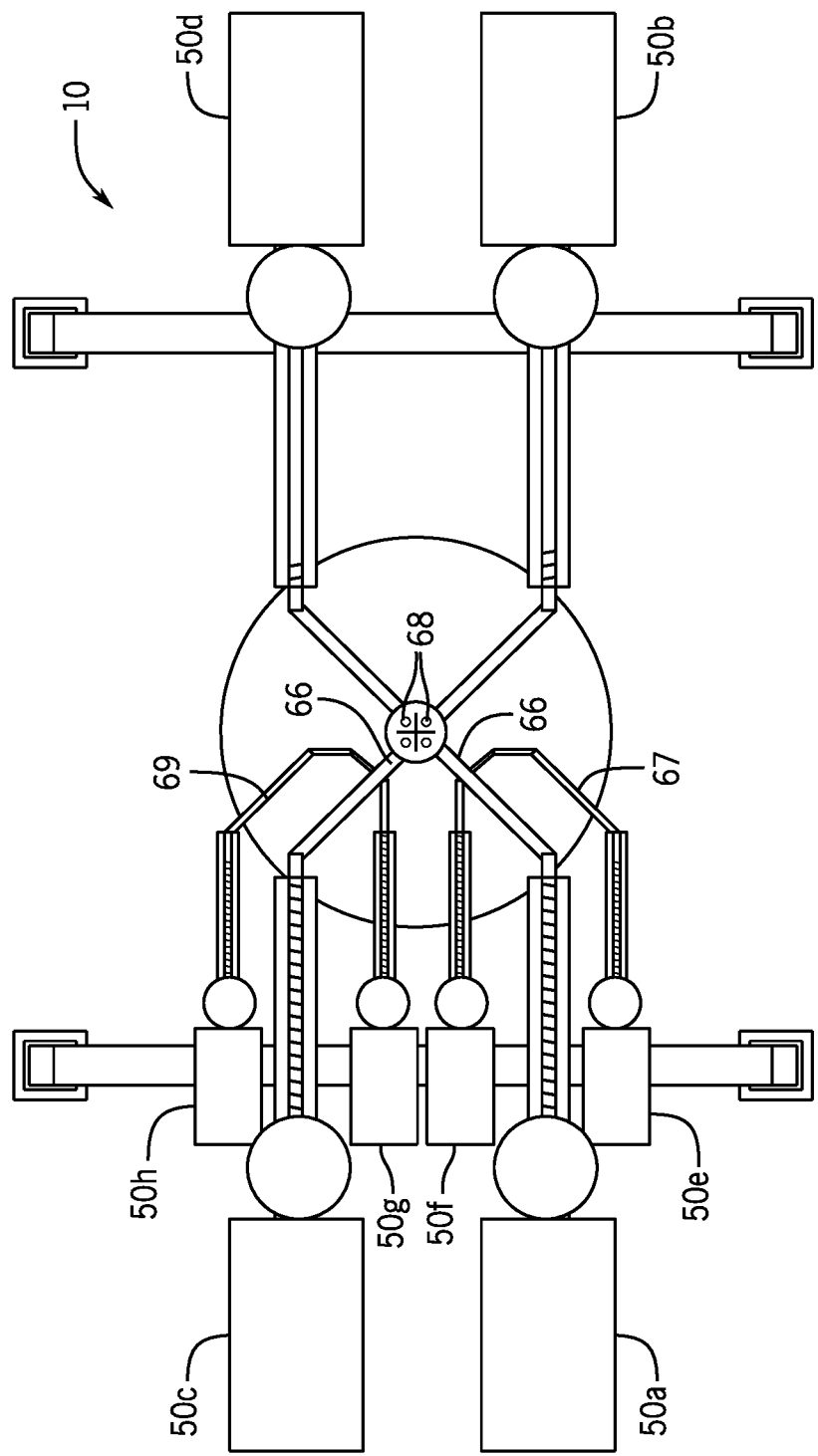
FIG. 4 schematically illustrates a top view of another embodiment of a blown film coextrusion line.

FIG. 4 is a schematic top view of an alternative blown film coextrusion line 10 that includes additional extruders. In addition to the four extruders 50*a*, 50*b*, 50*c* and 50*d*, two smaller satellite extruders 50*e* and 50*f* are mounted on both sides of the extruder 50*a* and two smaller satellite extruders 50*g* and 50*h* are mounted on both sides of the extruder 50*b*. The satellite extruders 50*e* and 50*f* feed individual polymer streams into two individual feed lines 67 that can ultimately approach the feed line 66 associated with extruder 50*a*. The polymer compositions from extruders 50*a*, 50*e* and 50*f* can thus be fed into three separate inlets 68 of coextrusion dies 70 to make three individual film layers. The satellite extruders 50*g* and 50*h* feed individual polymer streams into two individual feed lines 69 that can ultimately approach the feed line 66 associated with extruder 50*b*. The polymer compositions from extruders 50*b*, 50*g* and 50*h* can thus be fed into three separate inlets 68 of coextrusion dies 70 to make three individual film layers. In one embodiment, two smaller satellite extruders can be placed adjacent to all four extruders 50*a*, 50*b*, 50*c* and 50*d* to enable the feeding of twelve different polymer streams into the blown film coextrusion die 70, thus enabling the production of a wide variety of nanolayer film structures ranging from complex to simple as described in U.S. Publication 2020/0391425 and U.S. Publication 2020/0391427, for example.

Figure 5:
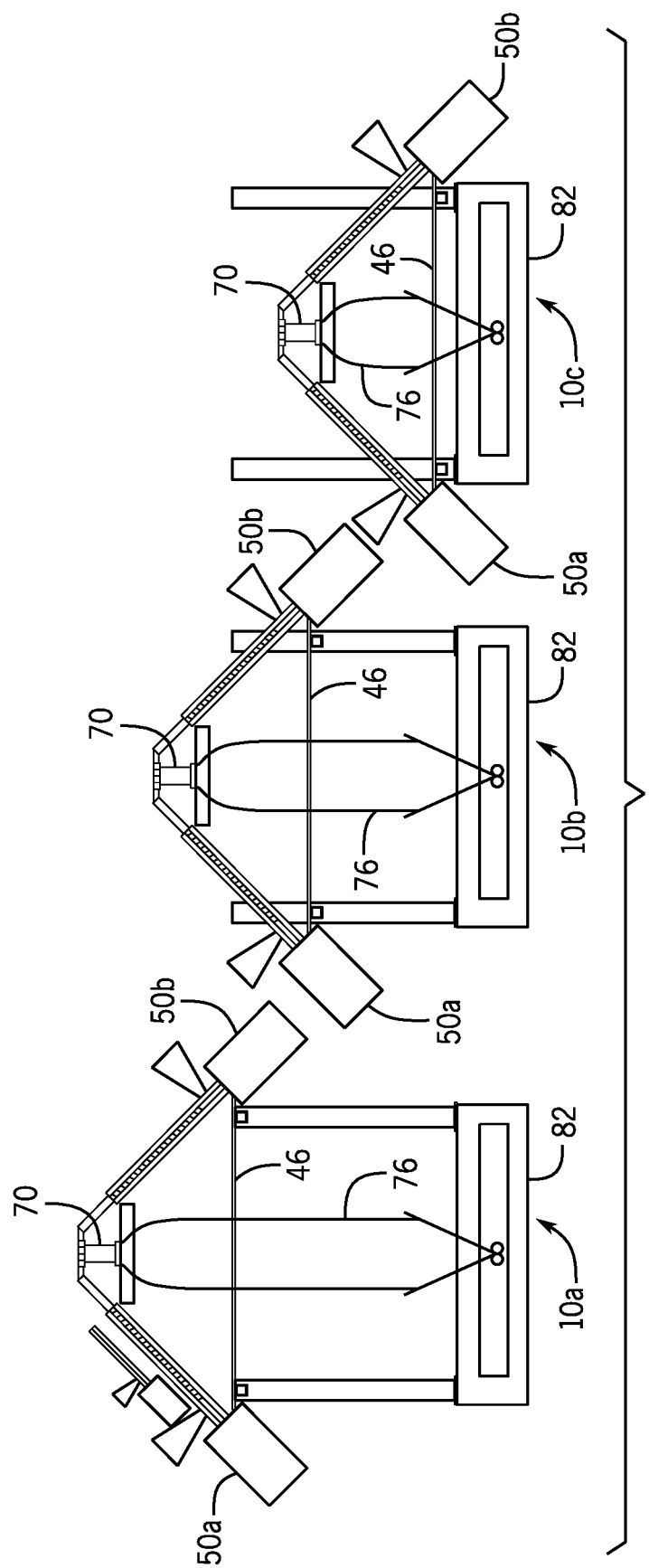
FIG. 5 schematically illustrates a front view of the blown film coextrusion line of FIG. 4, shown in three different vertical positions.

FIG. 5 schematically illustrates how the adjustable platform 46 described above can be used to raise and lower the extruders 50*a*, 50*b*, 50*c*, 50*d*, etc. (collectively "50"), and the blown film coextrusion die 70 to three different vertical positions in the blown film coextrusion line 10. In the most extended position 10*a*, the extruders 50 and die 70 are located furthest from the base 82, resulting in a relatively long blown film bubble 76 that may be suitable for higher production rates and/or polymer compositions that are more difficult to quench, thus warranting longer cooling distances. In the intermediate position 10*b*, the extruders 50 and die 70 are located midway above the base 82, resulting in a blown film bubble of intermediate length that may be suitable for intermediate production rates and/or polymer compositions that are relatively easier to quench when present in film layers. In the lowest position 10*c*, the extruders 50 and die 70 are located relatively close to the base 82, resulting in a short blown film bubble that may be suitable for lower production rates and/or polymer compositions that quench very quickly when present in film layers. The position 10*c* is also useful for cleaning, maintaining, and repairing the blown film coextrusion line 10 because the primary operating components are at or near the standing level of an operator.

The extruders 50 should have a suitable length and size to a) achieve the desired blown film production rates and b) extend an appropriate distance from the platform 46 to the coextrusion die 70 to provide the desired support for the die 70 and enable the formation of a triangular or other desired polygonal or polyhedral arrangement so as to alleviate the need for a tower or similar structure. In one embodiment, the primary extruders 50a, 50b, 50c and 50d can be 2-inch extruders made and sold by Davis-Standard, LLC and the satellite extruders can be somewhat smaller as needed to meet space limitations. The blown film coextrusion die 70 can be of suitable size to produce a 40-inch wide film at a production rate of 300 lbs./hr. Other sizes and dimensions of the extruders, coextrusion die and related components can also be selected as needed to provide coextruded blown films having a wide variety of sizes at a variety of production rates.

While the embodiments of the invention described herein are exemplary, various modifications and improvements can be made without departing from the spirit and scope of the invention. The scope of the invention is defined by the appended claims and all changes that fall within the meaning and range of equivalents are intended to be embraced therein.

We claim:

1. A blown film coextrusion line, comprising:
    a support frame including at least four upright support elements, a plurality of lateral support elements each joined to at least two of the upright support elements, and at least one longitudinal support element extending between at least two of the lateral support elements;
    at least a first extruder supported by a first of the lateral support elements and extending upward from the first of the lateral support elements at a first angle;
    at least a second extruder supported by a second of the lateral support elements and extending upward from the second of the lateral support elements at a second angle; and
    a downward facing blown film coextrusion die in fluid communication with a first distal end of the first extruder and a second distal end of the second extruder;
    wherein the first angle is from about 20 to about 70 degrees relative to horizontal, the second angle is about 20 to about 70 degrees relative to horizontal, and the first and second angles oppose each other.

2. The blown film coextrusion line of claim 1, further comprising a third extruder supported by the first of the lateral support elements and extending upward from the first lateral support element at a third angle;
    the downward facing blown film coextrusion line being in fluid communication with a third distal end of the third extruder;
    wherein the third angle is from about 20 to about 70 degrees relative to horizontal.

3. The blown film coextrusion line of claim 2, further comprising a fourth extruder supported by the second of the lateral support elements and extending upward from the second lateral support element at a fourth angle;
    the downward facing blown film coextrusion die being in fluid communication with a fourth distal end of the fourth extruder;
    wherein the fourth angle is from about 20 to about 70 degrees relative to horizontal, and the third and fourth angles oppose each other.

4. The blown film coextrusion line of claim 1, wherein the first and second angles are each about 35 to about 55 degrees from horizontal.

5. The blown film coextrusion line of claim 2, wherein the first, second and third angles are each about 35 to about 55 degrees from horizontal.

6. The blown film coextrusion line of claim 3, wherein the first, second, third and fourth angles are each about 35 to about 55 degrees from horizontal.

7. The blown film coextrusion line of claim 1, further comprising a winder assembly at or near a base of the support frame.

8. The blown film coextrusion line of claim 1, wherein the lateral and longitudinal support elements define a movable platform that can be moved vertically relative to the upright support elements.

9. A blown film coextrusion line, comprising:
    a support frame including at least four upright support elements, a plurality of lateral support elements each joined to at least two of the upright support elements, and at least one longitudinal support element extending between at least two of the lateral support elements;
    at least four extruders mounted to the plurality of lateral support elements, wherein at least a first and a third of the four extruders extend upward from a first of the lateral support elements at first and third angles, respectively, and at least a second and fourth of the four extruders extend upward from a second of the lateral support elements at second and fourth angles, respectively; and
    a downward facing blown film coextrusion die in fluid communication with a first distal end of the first extruder, a second distal end of the second extruder, a third distal end of the third extruder and a fourth distal end of the fourth extruder;
    wherein each of the first and third angles is from about 30 to about 60 degrees relative to horizontal, each of the second and fourth angles is about 30 to about 60 degrees relative to horizontal, and the second and fourth angles oppose the first and third angles, respectively.

10. The blown film coextrusion line of claim 9, wherein each of the first and third angles is about 40 to about 50 degrees relative to horizontal and each of the opposing second and fourth angles is about 40 to about 50 degrees relative to horizontal.

11. The blown film coextrusion line of claim 9, wherein the first and third angles are of the same magnitude.

12. The blown film coextrusion line of claim 11, wherein the opposing second and fourth angles are of the same magnitude.

13. The blown film coextrusion line of claim 9, further comprising fifth and sixth extruders mounted to at least one of the lateral support elements and having fifth and sixth distal ends in fluid communication with the blown film coextrusion die.

14. The blown film coextrusion line of claim 13, further comprising seventh and eighth extruders mounted to at least one of the lateral support elements and having seventh and eighth distal ends in fluid communication with the blown film coextrusion die.

15. The blown film coextrusion line of claim 14, further comprising ninth and tenth extruders mounted to at least one of the lateral support elements and having ninth and tenth distal ends in fluid communication with the blown film coextrusion die.

16. The blown film coextrusion line of claim 15, further comprising eleventh and twelfth extruders mounted to at least one of the lateral support elements and having eleventh and twelfth distal ends in fluid communication with the blown film coextrusion die.

17. A blown film coextrusion line, comprising:
a support frame;
at least a first extruder having a first proximal end and a first distal end, the first proximal end mounted to the support frame, the first extruder extending upward from the support frame toward the first distal end at a first angle;
at least a second extruder having a second proximal end and a second distal end, the second proximal end mounted to the support frame, the second extruder extending upward from the support frame toward the second distal end at a second angle; and
a downward facing blown film coextrusion die connected to the first distal end of the first extruder and the second distal end of the second extruder;
wherein the first angle is from about 30 to about 60 degrees relative to horizontal, the second angle is about 30 to about 60 degrees relative to horizontal, and the first and second angles oppose each other.

18. The blown film coextrusion line of claim 17, further comprising a third extruder mounted to the support frame and extending upward from the support frame at a third angle;
the downward facing blown film coextrusion die being in fluid communication with a third distal end of the third extruder;
wherein the third angle is about 30 to 60 degrees relative to horizontal.

19. The blown film coextrusion line of claim 18, further comprising a fourth extruder mounted to the support frame and extending upward from the support frame at a fourth angle;
the downward facing blown film coextrusion die being in fluid communication with a fourth distal end of the fourth extruder;
wherein the fourth angle is about 30 to 60 degrees relative to horizontal.

20. The blown film coextrusion line of claim 19, wherein the support frame further comprises a movable platform for raising and lowering the first and second extruders and the downward facing blown film coextrusion die.

* * * * *